United States Patent Office 2,837,536
Patented June 3, 1958

2,837,536

STABILIZATION OF HETEROCYCLIC OXYGEN-CONTAINING COMPOUNDS

Homer M. Fox, Bartlesville, Okla., assignor to Phillips Petroleum Company, a corporation of Delaware No Drawing. Application May 23, 1955
Serial No. 510,546

14 Claims. (Cl. 260—345.2)

This invention relates to stabilizing heterocyclic oxygen-containing compounds. In one of its aspects, this invention relates to an improved method of stabilizing heterocyclic oxygen-containing compounds and their derivatives during storage or use.

Various organic compounds, and especially certain non-hydrocarbon compounds, are unstable in storage or in use, while being transferred or during treatment, and form undesirable gums, undergo discoloration, become rancid or otherwise deteriorate due to oxidation, polymerization, or other undesired reaction. Included among the organic non-hydrocarbon compounds which undergo such deterioration are the heterocyclic oxygen-containing compounds. Various methods have been employed in the past to treat these organic compounds in order to secure satisfactory stability. One such method comprises adding to such compounds a stabilizing amount of a second compound which inhibits the undesired deterioration. However, there is a constant search for new and improved inhibitors.

An object of this invention is to provide a method for stabilizing heterocyclic oxygen-containing compounds.

Another object of this invention is to prevent gum formation and color deterioration of heterocyclic oxygen-containing compounds during shipment or storage.

Another object of this invention is to provide a stabilized heterocyclic oxygen-containing compound.

Still other objects and advantages of this invention will be apparent to those skilled in the art having been given this disclosure.

According to the method of this invention, a heterocyclic oxygen-containing compound is stabilized against deterioration by incorporating therein a stabilizing amount of compound having the general formula

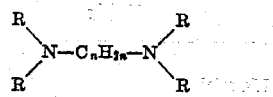

wherein R can be the same or different and each R is selected from the group consisting of hydrogen, alkyl-, aryl-, aralkyl-, alkaryl, cycloalkyl-, and cycloalkanylalkyl radicals, and $n$ is an integer. The above formula includes hydrazine and substituted hydrazine as well as di-tertiary-$\alpha,\omega$-diamines.

I have found that a compound of the above defined class will stabilize heterocyclic oxygen-containing compounds against deterioration. The preferred embodiment of this invention comprises stabilizing liquid heterocyclic oxygen-containing compounds with liquid stabilizing compounds, however, it is within the scope to stabilize normally solid compounds especially where they are in solution. It is also within the scope of this invention to use normally solid stabilizing compounds where they are soluble in the compound being stabilized or they can be used in suitable solvents.

This invention is broadly applicable to stabilizing heterocyclic oxygen-containing compounds, and is especially applicable to stabilizing unsaturated heterocyclic compounds containing four carbon atoms and one oxygen atom and certain closely related derivatives of these heterocyclic compounds. The stabilizing compound has been found to be especially advantageous when used with furans and their derivatives. Examples of these preferred compounds include furan; oxygenated derivatives of furan such as furfuryl alcohol, furoic acid and its esters, hydrofuramide, furfuryl acetate; alkyl derivatives of furan such as 2-methylfuran, 2,5-dimethylfuran, 2-methyl-3-ethylfuran, 2,4-diethylfuran, 2-n-propylfuran, 2-isopropylfuran, 3-butylfuran, 2-hexylfuran; free hydroxy- and aminofurans such as 2-aminofuran, 3-hydroxy-2,4,5-triphenylfuran and the like; and halogenated furans such as 2-chlorofuran, 3-bromofuran, 2-tert-butyl-5-chlorofuran, 2-sec-butyl-5-chlorofuran and the like. Other heterocyclic oxygen-containing compounds which can be stabilized by the inhibitors of this invention include the condensed furan compounds such as benzofuran, isobenzofuran, dihydrobenzofuran, coumaran-3-one, diphenylene oxide (dibenzofuran); substituted condensed furans such as 2-ethyl-3-propylbenzofuran, 2,3-dimethyl benzofuran; the five carbon atoms and heterocyclic oxygen-containing compounds and their derivatives such as pyran, pyrone, dihydropyran, dialkyl pyrans, amino-, hydroxy-, halogen-, and the like substituted pyrans, chromone and similar substituted chromone, flavone, isoflavone, flavanol and the like and alkyl-, aryl-, arkyl-, cycloalkyl- and cycloalkanylalkyl-derivatives of the above.

As has been indicated the stabilizing compound of this invention can be represented by the formula

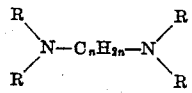

wherein each R is selected from the group consisting of hydrogen, alkyl-, aryl-, aralkyl-, alkaryl, cycloalkyl-, and cycloalkanylalkyl radicals, and $n$ is an integer. It is preferred that $n$ be an integer in the range of 0–6 since such compounds are generally normally liquid, however, $n$ can be larger and the compound still be effective. I have found that when R is hydrogen the inhibitor is more effective than when hydrocarbon radical, and that the lower hydrocarbon radicals are more effective than the higher hydrocarbon radicals and therefore R preferably will contain no more than 6 carbon atoms. On the other hand R can contain a greater number of carbon atoms so long as these substituents are not so long as to cause steric hindrance. I particularly prefer that no R group contain more than 6 carbon atoms and at least one R be selected from the group consisting of hydrogen, methyl, ethyl-, n-propyl- and isopropyl hydrocarbon groups and the greater the number of such groups the more effective will be the inhibitor. Examples of the preferred inhibitors of this invention include hydrazine, N,N,N',N'-tetramethylhydrazine, N,N-diphenylhydrazine, ethylhydrazine, ethyl-phenyl hydrazine, methyl hydrazine, isopropylhydrazine, N,N - diphenyl-N', N' - dimethylhydrazine, N,N,N',N', - tetrapropyl hydrazine, N',N'-dihexyl-N,N,-diethyl hydrazine, and the like; methylene diamine, ethane-1,2-diamine, propane-1,3 - diamine, hexane - 1,3-diamine, N,N-dimethyl ethane-1,2 - diamine, N,N,N',N'-tetramethyl propane-1,3-diamine, N,N-dimethyl-N',N'-dihexyl pentane-1,5-diamine, N,N,N'-trihexyl hexane-1,6-diamine, N,N'-diphenyl butane-1,4-diamine, and the like. Other compounds which are effective as inhibitors include N,N,N',N'-tetrapentyl octane-1,8-diamine, N,N;N',N'-tetrahexyl octane-1,8-diamine, N,N-dioctyl heptane-1,7-diamine, tetraheptyl hydrazine and the like.

In using the stabilizing compounds of this invention it should be understood that they are not necessarily equivalent in their effect and cannot necessarily be used to replace one another equal effect either on a weight or chemically equivalent basis. The quantity of the stabilizing compound to be used will vary and is a function of the particular inhibitor used, the heterocyclic oxygen-containing compound and the degree of stabilization desired, the latter being dependent upon use, storage conditions such as time, temperature, etc. In general 0.1 to 10 weight percent will be effective. The furan and furan derivatives have found use in many industrial or commercial applications such as solvents, chemical intermediates and the like. These compounds are frequently prepared at a place remote from the place where they are to be used and therefore it is desirable to stabilize these materials for storage and shipment. For these reasons, I will illustrate the effectiveness of my invention in stabilizing furfuryl alcohol. I will also use the simplest of these stabilizing compounds, hydrazine, and one of the preferred N,N,N',N'-alkyl-α,ω-diamines (N,N,N',N'-tetramethyl propane-1,3-diamine). It will be understood by those skilled in the art, having been given this disclosure, that the other ditertiary-α,ω-diamines and hydrocarbon-radical substituted hydrazines and ditertiary-α,ω-diamines are also effective keeping in mind that the simpler substituents are more effective than are the higher substituents as is illustrated by the two compounds chosen to illustrate this invention in the example.

EXAMPLE I

Furfuryl alcohol without any inhibitor and containing either 5 percent hydrazine or 5 percent N,N,N',N'-tetramethyl propane-1,3-diamine was subjected to steam jet gum tests according to ASTM method D–381–54T. The data are presented in the table.

Table I

| Material | Steam-Jet Gum, mg./100 ml. | After 60 Days at 140° F. |
|---|---|---|
| Furfuryl Alcohol | 63.6 | 1,397.0 |
| + 5% hydrazine | 12.8 | 9.2 |
| + 5% N,N,N',N'-tetramethyl-propane-1,3-diamine | 26.8 | 572.0 |

It can be seen from these data that hydrazines and ditertiary-α,ω-diamines are inhibitors and improve storage stability and that the simpler hydrazine is more effective than the N,N,N',N'-tetraalkyl-α,ω-diamine.

I claim:

1. A method of stabilizing the heterocyclic oxygen-containing compound wherein said heterocyclic oxygen is present in a ring selected from the group consisting of the furan and pyran rings; which comprises incorporating and maintaining therein during storage 0.1 to 10 weight percent based on the compound being stabilized of a compound having the structural formula

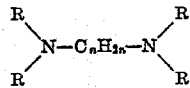

wherein $n$ is an integer of 0 to 6, and each R is selected from the group consisting of hydrogen, alkyl-, aryl-, cycloalkyl- and cycloalkanylalkyl-radicals, and wherein each of said hydrocarbon radicals contains not more than 6 carbon atoms.

2. The method of claim 1 wherein the stabilizing compound is in the range of 0.1 to 10 weight percent based on the heterocyclic oxygen-containing compound.

3. The method of claim 1 wherein R is hydrogen and $n$ is 0.

4. The method of claim 1 wherein R is methyl and $n$ is 3.

5. The method of claim 1 wherein at least one R is hydrogen and the remaining R's are alkyl groups containing 1–3 carbon atoms.

6. The method of claim 1 wherein the R's are alkyl groups containing 1–3 carbon atoms.

7. A stabilized composition of matter comprising a heterocyclic oxygen-containing compound selected from the group consisting of furan and pyran having admixed therein a stabilizing amount of a compound of the structural formula

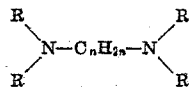

wherein each R is selected from the group consisting of hydrogen, alkyl-, aryl-, cycloalkyl- and cycloalkanylalkyl-radicals wherein each of said hydrocarbon radicals contains not more than six carbon atoms, and $n$ is an integer of 0 to 6.

8. A stabilized composition of matter comprising a heterocyclic oxygen-containing compound wherein said heterocyclic oxygen is present in a ring selected from the group consisting of the furan and pyran rings having incorporated therein 0.1 to 10 weight percent based on said heterocyclic compound of a compound having the structural formula

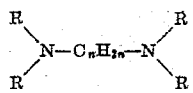

wherein $n$ is an integer selected from the group consisting of 0, 1, 2, 3, 4, 5 and 6, and R is selected from the group of hydrogen, alkyl-, aryl-, cycloalkyl-, and cycloalkanylalkyl radicals wherein each of the hydrocarbon radicals contains not more than six carbon atoms.

9. A stabilized composition of matter comprising a heterocyclic oxygen-containing compound having solely 4–5 carbon atoms and one oxygen atom in the heterocyclic ring, said ring containing unsaturation, having incorporated therein 0.1 to 10 weight percent based on said heterocyclic compound of a compound having the structural formula

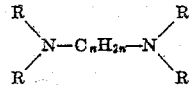

wherein $n$ is an integer selected from the group consisting of 0–6 inclusive and R is selected from the group consisting of hydrogen, alkyl-, aryl-, cycloalkyl-, and cycloalkanylalkyl radicals wherein each of the hydrocarbon radicals contains not more than six carbon atoms.

10. The composition of claim 8 wherein R is hydrogen.
11. The composition of claim 8 wherein R is methyl.
12. The composition of claim 8 wherein at least one R is hydrogen.
13. The composition of claim 8 wherein at least one R is hydrogen and the remaining R's are alkyl groups containing 1–3 carbon atoms.
14. The composition of claim 8 wherein the R's are alkyl radicals containing 1–3 carbon atoms.

References Cited in the file of this patent

UNITED STATES PATENTS

| 1,793,635 | Reed | Feb. 24, 1931 |
| 2,216,020 | Nordlander | Sept. 24, 1940 |
| 2,396,557 | Cox | Mar. 12, 1946 |
| 2,438,975 | Jones | Apr. 6, 1948 |
| 2,701,241 | Wood | Feb. 1, 1955 |

FOREIGN PATENTS

| 702,893 | Germany | Feb. 19, 1944 |
| 688,703 | Great Britain | Mar. 11, 1953 |